United States Patent [19]

Horwitz et al.

[11] Patent Number: 4,575,248

[45] Date of Patent: Mar. 11, 1986

[54] WAVEFRONT SENSOR EMPLOYING NOVEL D.C. SHEARING INTERFEROMETER

[75] Inventors: Bruce A. Horwitz, Newton; Alan J. MacGovern, Acton, both of Mass.

[73] Assignee: Itek Corporation, Lexington, Mass.

[21] Appl. No.: 621,408

[22] Filed: Jun. 18, 1984

[51] Int. Cl.$^4$ .............................................. G01B 9/02
[52] U.S. Cl. .................................... 356/353; 356/359
[58] Field of Search ........................ 356/353, 359, 360

[56] References Cited

U.S. PATENT DOCUMENTS 3,829,219  8/1974  Wyant ............................ 356/354 X
4,084,907  4/1978  Pinard et al. ........................ 356/346

OTHER PUBLICATIONS

Assa et al., "Slope and Curvature Measurement by a Double-Frequency Grating Shearing Interferometer", *Experimental Mechanics*, vol. 19, No. 4, pp. 129–137, Apr. 1979.

*Primary Examiner*—Davis L. Willis
*Assistant Examiner*—Matthew W. Koren
*Attorney, Agent, or Firm*—Michael H. Wallach; Robert F. Rotella

[57] ABSTRACT

A wavefront sensor employs a novel DC shearing interferometer which produces four interferograms which are 90° phase shifted with respect to each other. The incoming wavefront is replicated into two beams, a portion of each being reflected off of a beamsplitter and the remaining portion being transmitted therethrough, at first and second portions of the beamsplitter. After leaving the beamsplitter the transmitted and reflected beams are reflected back 180° by a pair of retroreflectors, and directed at third and fourth portions of the beamsplitter. The retroreflectors are adjusted to produce four shearing interferograms and a quarter wave plate is positioned in the path of one of the beams to cause the four interferograms to have a 90° phase shifted relationship with respect to each other. The interferograms are thereafter projected upon intensified self scanning diode arrays, which digitize the interference patterns for convenient processing by means of a four-bin algorithm, which in turn generates estimated phase data indicative of the shape of the wavefront in a given direction. The process may be duplicated to produce second measurements in an orthogonal direction, which enables the mapping of the wavefront in both X and Y. In contrast with A.C. shearing interferometers, the wavefront shapes of very brief plused beams of light may be measured.

27 Claims, 1 Drawing Figure

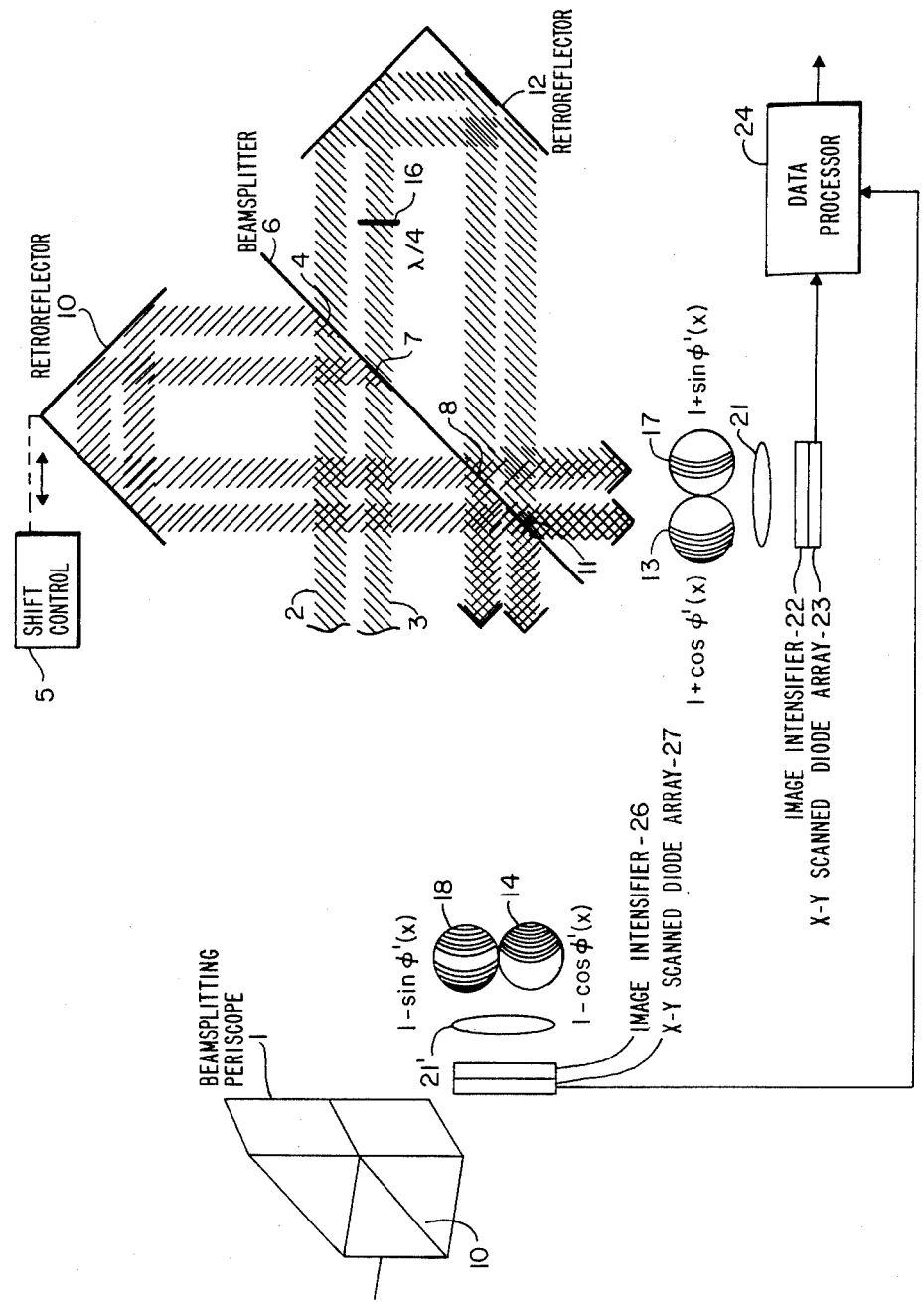

WAVEFRONT SENSOR EMPLOYING NOVEL D.C. SHEARING INTERFEROMETER

BACKGROUND OF THE INVENTION

The present invention relates to the field of wavefront sensors, and more particularly those employing shearing interferometers.

It is often desirable to measure the shape of the wavefront of an incoming beam of light by measuring the wavefront slope at a plurality of locations in the aperture of the beam being measured in two given directions. Shearing interferometers have been employed to perform this operation and reference may be made to U.S. Pat. No. 3,829,219 to James Wyant and U.S. Pat. No. 3,923,400 to John W. Hardy, together with a paper to J. F. Ebersole and James Wyant entitled "Collimated Light Acoustooptic Lateral Shearing Interferometer", Applied Optics, Volume 13, No. 5, May, 1974 and the references cited therein. See also copending patent application Ser. No. 562,656, filed Dec. 19, 1983 in the names of Al MacGovern and Richard Howell, entitled Shearing Interferometer Employing An Acousto-Optic Cell. The above mentioned publications teach the use of A.C. interferometers which employ moving gratings of different spatial frequencies to produce a shearing interferogram which in turn is examined, to determine the changes in the slope of the wavefront of the incoming beam. The relative motion of the gratings with respect to the incoming wavefront produce electrical A.C. signals within the photodiode arrays, the signals are in turn detected for relative phase shift to indicate the slope of the wavefront in a given direction. The process is repeated in a direction generally at right angles to the previous motion of the gratings, and the X and Y wavefront slopes may then be employed to reconstruct the wavefront shape.

It is highly desirable to measure the shape of the wavefront of an incoming pulsed beam of light of short duration. Under these circumstances, the use of an A.C. shearing interferometer taught in the prior art may not be practical since the wavefront in the case of a pulsed beam may not have a sufficient time duration to be examined in accordance with the principles of A.C. interferometry. What is desired, is a wavefront sensor which maximizes the utilization of the available light in the short time interval of reception of the pulsed beam. It is also highly desirable to provide a wavefront sensor which has a high photon efficiency whereby virtually all of the light is utilized to make the phase estimates required to produce the wavefront slope information. It is also highly desirable to provide a device which is highly stable and may be fabricated in a compact manner by means of a monolithic block of optical material of small size. It is a further object of the invention to provide a wavefront sensor which has a broad wavelength band capability with a near zero optical path difference throughout.

SUMMARY OF THE INVENTION

In accordance with preferred methods and embodiments of the invention, the incoming wavefront is replicated into first and second beams which are transmitted through and reflected off of a beamsplitter at first and second portions thereof. The reflected and transmitted beams are redirected back at the beamsplitter. The relative position of the retroreflectors for returning the beams back to the beamsplitter is adjusted to produce shearing interferograms at the third and fourth beamsplitter portions, and preferably a one quarter wave delay plate is introduced in the path of one of the beams before being returned to the beamsplitter. As a result of the foregoing, four phase shifted shearing interferograms are produced having phase shifts of 90° between them, such interferograms being imaged upon two intensified self-scanned diode arrays, which measure the intensity of the interferograms at various points. Due to the 90° phase shifts introduced between the interferograms, a four bin algorithm may be readily applied to the digital data representative of the four interferograms, to provide information indicative of the slopes of the incoming wavefront in a given direction.

Other objects, features and advantages of the present invention will become apparent upon study of the sole FIGURE taken in conjunction with the following description.

SPECIFIC DESCRIPTION

Referring now to the sole FIGURE, the wavefront under examination is directed at the lower portion of a beamsplitting periscope 1, wherein the wavefront is replicated due to beamsplitter 10 to form a first beam 2 and a second beam 3, laterally shifted with respect to beam 2. Beam 2 is directed at a first portion 4 of beam splitter 6, whereas beam 3 is directed at a second portion 7 of beamsplitter 6. A first portion of beam 2 is reflected by the beamsplitter and is directed at a first retroreflector 10, which changes its direction 180° to cause the second beam to be redirected at a third portion 11 of beamsplitter 6, whereas the second beam 3 is reversed 180° by retroreflector 10 and is directed at a fourth portion 8 of beamsplitter 6 as indicated. The first beam 2 is also transmitted through portion 4 of the beamsplitter and is reversed 180° in direction by second retroreflector 12 to be directed at portion 11 of the beamsplitter, and the second beam 3 is also transmitted through portion 7 of the beamsplitter and, is reversed 180° in direction by retroreflector 12 and is directed at portion 8 of beamsplitter 6. Preferably about half of the light is reflected and the remaining half transmitted through the beamsplitter.

A position shift control device 5 is illustrated for shifting retroreflector 10 with respect to retroreflector 12. The relative positions of the retroreflectors are adjusted so that shearing interferograms are produced at the third portion 11 and the fourth portion 8 of beamsplitter 6. A first pair of shearing interferograms 13 and 14 are produced at two exit pupils as illustrated, such interferograms being 180° out of phase with respect to each other because the beamsplitter is non-energy absorbing and the principle of conservation of energy ensures that bright regions in one pattern must be matched by dark regions in the other. In accordance with a feature of the preferred method of the present invention, a quarter wave delay plate 16 is introduced into the second beam as illustrated, and such delay causes the third interferogram 17 to be shifted 90° with respect to interferogram 13; again owing to conservation of energy, the fourth interferogram 18 will be 180° out of phase with 17. As a result of the foregoing, four sheared interferograms are simultaneously produced at the exit pupils having 0, 90, 180, and 270 degree phase shifts. While useful information may be obtained by visually examining the interferograms, further processing is preferred. Thus, the resulting four interferograms are each appropriately phased by the D.C. interferometer described above, for processing by the use of the four-bin algorithm.

The use of the four-bin algorithm is a technique for estimating the phase of sinusoidal signals of the form $S = A + B \sin(\phi + \phi_0)$, where $\phi$ is a controllable phase variable, $\phi_0$ is the phase being estimated, and S is the measurable signal. If four signals, S1, S2, S3, S4 are measured with $\phi$ set to 0, 90, 180 and 270 degrees respectively, then it may be readily shown that $$\phi_0 = \arctan \frac{S_1 - S_3}{S_2 - S_4}$$

is an analytically exact estimation formula.

It should be noted that while similar results can be obtained with either fewer or more samples, or with phase samples at different spacings, the algorithm used above is particularly convenient because of the equal weighting of the four measured values, and because the phase error variance due to photon noise is independent of the phase angle.

In order to estimate the phase of the interferograms at a plurality of sub-apertures which extend across the wavefront being measured, interferograms 13 and 17 are imaged by lens 21 at image intensifier 22 which intensifies the optical interference pattern and directs it at an xy scanned diode array 23. The images are scanned and the resulting digital pixel data is applied to data processor 24 which is of a known prior art configuration. In like manner, interferograms 18 and 14 are focused upon image intensifier 26 by lens 21 to enable xy scanned diode array 27 to forward streams of digital data representing image pixel intensity to data processor 24. The above mentioned algorithm is applied to the data on a sub-aperture by sub-aperture basis, in order to estimate phase shifts in a given direction, of the wavefront introduced at the input of the system, namely at beamsplitting periscope 1.

The above described system thus includes a novel interferometer for producing simultaneously four interferograms, each appropriately phased for processing by means of the four-bin algorithm. The result is a measurement of wavefront slope at a plurality of wavefront locations in the aperture of the system, and in a given direction. Since the principles of shearing interferometry are well understood, reference may merely be made to the U.S. Pat. Nos. 3,829,219 to James Wyant; John W. Hardy, 3,923,400; a paper to J. F. Ebersole and J. C. Wyant entitled "Collimated Light Acoustooptic Lateral Shearing Interferometer"; Applied Optics, Vol. 13, #5, May, 1974 and the references cited therein. See also a paper entitled "Real Time Atmospheric Compensation" to J. W. Hardy et al, Journal of the Optical Society of America, Vol. 67, #3, March, 1977, together with the extensive bibliography set forth therein.

Small tuning adjustments to the ¼ wave delay plate may be made by tilting the plate. Larger wavelength changes are accommodated by plate replacement. An alternative approach in compensating for wavelength changes is to modify the arc tan processing to account for the error in the quarter wave delay. Each detector array could have 64×64 detector sites, each 100 microns by 100 microns, with a virtual 100% fill factor. Readout may be performed through 32 parallel output ports, where 16 ports serve half of the device, and 16 serve the other. Each port may be fed serially by four rows of pixels, 32 columns deep. The normal readout sequence is to read the four pixels of the column nearest the port, followed by the four pixels of the second nearest column, etc. The primary functions performed in data processor 24 are analog to digital conversion of the pixel data, gain and offset compensation, data buffering and sequencing, application of four-bin arctangent function, addition of system calibration offsets, and final data output sequencing and buffering. The implementation of these operations is obvious to the worker in the art and hence will not be described in detail in the interests of brevity and economy.

Interference will be observed even for broadband sources as long as the optical paths from the beamsplitter to the retroreflectors, which could be right angle prisms, corner cubes, or mirror equivalents, are matched to within the coherence length.

The system described above would produce data indicative of wavefront phase shifts across the beam aperture for x direction shear. While such data is useful, the system would generally be expanded to also produce Y-shear measurement in an orthogonal direction. The use of an image rotating beamsplitter in the input beam, could be employed to produce spatial multiplexing of the optical components and the intensified detector arrays. A detailed description of the expansion of the foregoing system for measuring both x and y wavefront gradients has not been included herein in the interest of brevity and economy. However, replication of the first and second beams described above may be carried out by a double dove or other beam replication prism which may also "rotate" the replicated beam by 90°, required for orthogonal x and y gradient measurements discussed in the aforesaid patents. The above described 90° phase shift of one beam with respect to the other may also be obtained by tipping (rather than translating) the right angle prism slightly in the plane formed by its apex and the input optical axis, or by rotating the fold mirror in the beam dividing periscope 1, rather than employing quarter wave plate 16. The optical elements could be, and are preferably formed in a monolithic construction, which would be unaffected by vibration, shock or misalignment. The concepts described above may be implemented in other interferometer configurations, e.g. Mach-Zehnder or Sagnac configurations. Polarization properties of light may be utilized to introduce the required phase shift as is apparant to the ordinary worker in the art. In the preferred embodiment beamsplitter 6 reflects about 50% of the light and transmits the other 50%. The term "beamsplitter" as used in the claims is intended to include physically separate beamsplitter components although a single beamsplitter component as illustrated is preferred.

Other methods and apparatus may be employed in connection with use of the present invention, and the scope of the invention is to be restricted solely by the language of the following claims, and reasonable equivalents thereof.

We claim:
1. Method of measuring the shape of an incoming wavefront of light comprising the steps of:
    a. providing first and second retroreflector means together with a beamsplitter;
    b. replicating said incoming wavefront into a first and second beam;
    c. directing said first and second beams at first and second portions respectively of said beamsplitter;

d. redirecting first portions of said first and second beams reflected off of said beamsplitter at third and fourth portions of said beamsplitter respectively via said first retroreflector means;

e. redirecting second portions of said first and second beams transmitted through said beamsplitter at said third and fourth portion respectively of said beamsplitter via said second retroreflector means, for producing interference between said first and second beams at said third and fourth portions of said beamsplitter;

f. introducing a phase shift between said first and second beams before said first and second beams are directed at said third and fourth portion of said beamsplitter;

g. adjusting the relative positions between said first and second beams to produce shearing interferograms at said third and fourth portions of said beamsplitter;

h. examining first and second shearing interferograms produced by combining said first and second beams at one side of said beamsplitter at said third and fourth portions thereof; and i. examining third and fourth shearing interferograms produced by combining said first and second beams at the other side of said beamsplitter at said third and fourth portions thereof.

2. The method of claim 1, including phase shifting said first and second beams 90° with respect to each other before being directed at said third and fourth portions of said beamsplitter.

3. The method of claim 2, wherein said phase shifting is produced by introducing a quarter wave delay plate in the path of one of said first and second beams.

4. The method of claim 3 wherein said plate is positioned in the path of said second beam.

5. The method of claim 1 wherein said step g. of adjusting the relative positions of said first and second beams comprises laterally shifting the position of one of said retroreflector means with respect to the other.

6. The method of claim 2 wherein said step g. of adjusting the relative positions of said first and second beams comprises laterally shifting the position of one of said retroreflector means with respect to the other.

7. The method of claim 1 wherein each of said first and second beams is reversed 180° in direction by said first and second retroreflector means for directing each beam at said third and fourth portion of said beamsplitter.

8. The method of claim 2 wherein each of said first and second beams is reversed 180° in direction by said first and second retroreflector means for directing each beam at said third and fourth portion of said beamsplitter.

9. The method of claim 5 wherein each of said first and second beams is reversed 180° in direction by said first and second retroreflector means for directing each beam at said third and fourth portion of said beamsplitter.

10. The method of claim 6 wherein each of said first and second beams is reversed 180° in direction by said first and second retroreflector means for directing each beam at said third and fourth portion of said beamsplitter.

11. The method of claim 1 wherein about 50% of the light of said first and second beams is transmitted through said beamsplitter and 50% is reflected off of said beamsplitter.

12. The method of claim 2 wherein about 50% of the light of said first and second beams is transmitted through said beamsplitter and 50% is reflected off of said beamsplitter.

13. The method of claim 5 wherein about 50% of the light of said first and second beams is transmitted through said beamsplitter and 50% is reflected off of said beamsplitter.

14. The method of claim 6 wherein about 50% of the light of said first and second beams is transmitted through said beamsplitter and 50% is reflected off of said beamsplitter.

15. The method of any of claims 1 through 14 wherein said steps of examining said first, second, third and fourth shearing interferograms includes recording the intensity values of the images thereof for each spatial wavefront location; and applying a four-bin algorithm to the data produced by the preceeding step to obtain the estimated relative interferogram phase $\phi_o$ across said wavefront for each spatial wavefront location, said algorithm taking the form of $\phi_o = $ arc tan $[(S1-S3)$ divided by $(S2-S4)]$ where $\phi_o$ equals said estimated relative interferogram phase at each wavefront location; $S1, S2, S3, S4$, represent four recorded interferogram sinusoidal signals $S = A + B \sin(\phi + \phi_o)$; $\phi$ being 0°, 90°, 180° and 270° for each of said interferograms respectively.

16. Interferometric apparatus for measuring the shape of an incoming wavefront of light comprising:

a. first and second retroreflector means together with a beamsplitter;

b. means for replicating said incoming wavefront into a first and second beam;

c. means for directing said first and second beams at first and second portions respectively of said beamsplitter;

d. first retroreflector means for redirecting first portions of said first and second beams reflected off of said beamsplitter at third and fourth portions of said beamsplitter respectively;

e. second retroreflector means for redirecting second portions of said first and second beams transmitted through said beamsplitter at said third and fourth portion respectively of said beamsplitter for producing interference between said first and second beams at said third and fourth portions of said beamsplitter;

f. phase shifting means for introducing a phase shift between said first and second beams before said first and second beams are directed at said third and fourth-portion of said beamsplitter;

g. means for adjusting the relative positions between said first and second beams to produce shearing interferograms at said third and fourth portions of said beamsplitter;

h. means for examining first and second shearing interferograms produced by combining said first and second beams at one side of said beamsplitter at said third and fourth portions thereof; and i. means for examining third and fourth shearing interferograms produced by combining said first and second beams at the other side of said beamsplitter at said third and fourth portions thereof.

17. The apparatus of claim 16 wherein said phase shifting means shifts the phase of said first and second beams 90° with respect to each other before being directed at said third and fourth portions of said beamsplitter.

18. The apparatus of claim 17 wherein said phase shifting means is a quarter wave delay plate.

19. The apparatus of claim 18 wherein said plate is positioned in the path of said second beam.

20. The apparatus of claim 16 wherein said means for adjusting the relative positions of said first and second beams comprises means for laterally shifting the position of one of said retroreflector means with respect to the other.

21. The apparatus of claim 17 wherein said means for adjusting the relative positions of said first and second beams comprises means for laterally shifting the position of one of said retroreflector means with respect to the other.

22. The apparatus of claim 16 wherein said first and second retroreflector means reverse said first and second beams 180° for directing each beam at said third and fourth portion of said beamsplitter.

23. The apparatus of claim 17 wherein said first and second retroreflector means reverse said first and second beams 180° for directing each beam at said third and fourth portion of said beamsplitter.

24. The apparatus of claim 20 wherein said first and second retroreflector means reverse said first and second beams 180° for directing each beam at said third and fourth portion of said beamsplitter.

25. The apparatus of claim 21 wherein said first and second retroreflector means reverse said first and second beams 180° for directing each beam at said third and fourth portion of said beamsplitter.

26. The apparatus of claim 25 wherein said beamsplitter transmits about 50% of the light directed thereat and reflects about 50%.

27. The apparatus of any of claims 16 through 26 wherein said means for examining said first, second, third and fourth shearing interferograms includes means for electronically recording the intensity values of the images thereof for each spacial wavefront location; and processor means for applying a four-bin algorithm to said intensity values to obtain the estimated relative interferogram phase across said wavefront for each spacial wavefront location, said algorithm taking the form of $\phi_o = \arctan[(S1-S3)$ divided by $(S2-S4)]$ where $\phi_o$ equals said estimated relative interferogram phase at each wavefront location; $S_1$, $S_2$, $S_3$, $S_4$, representing four recorded interferogram sinusoidal signals $S = A + B \sin(\phi + \phi_o)$; $\phi$ being 0°, 90°, 180° and 270° for each of said interferograms respectively.

* * * * *